Sept. 19, 1950 G. L. BRIDGER 2,522,500
PRODUCTION OF PHOSPHATIC FERTILIZERS
Filed April 20, 1949
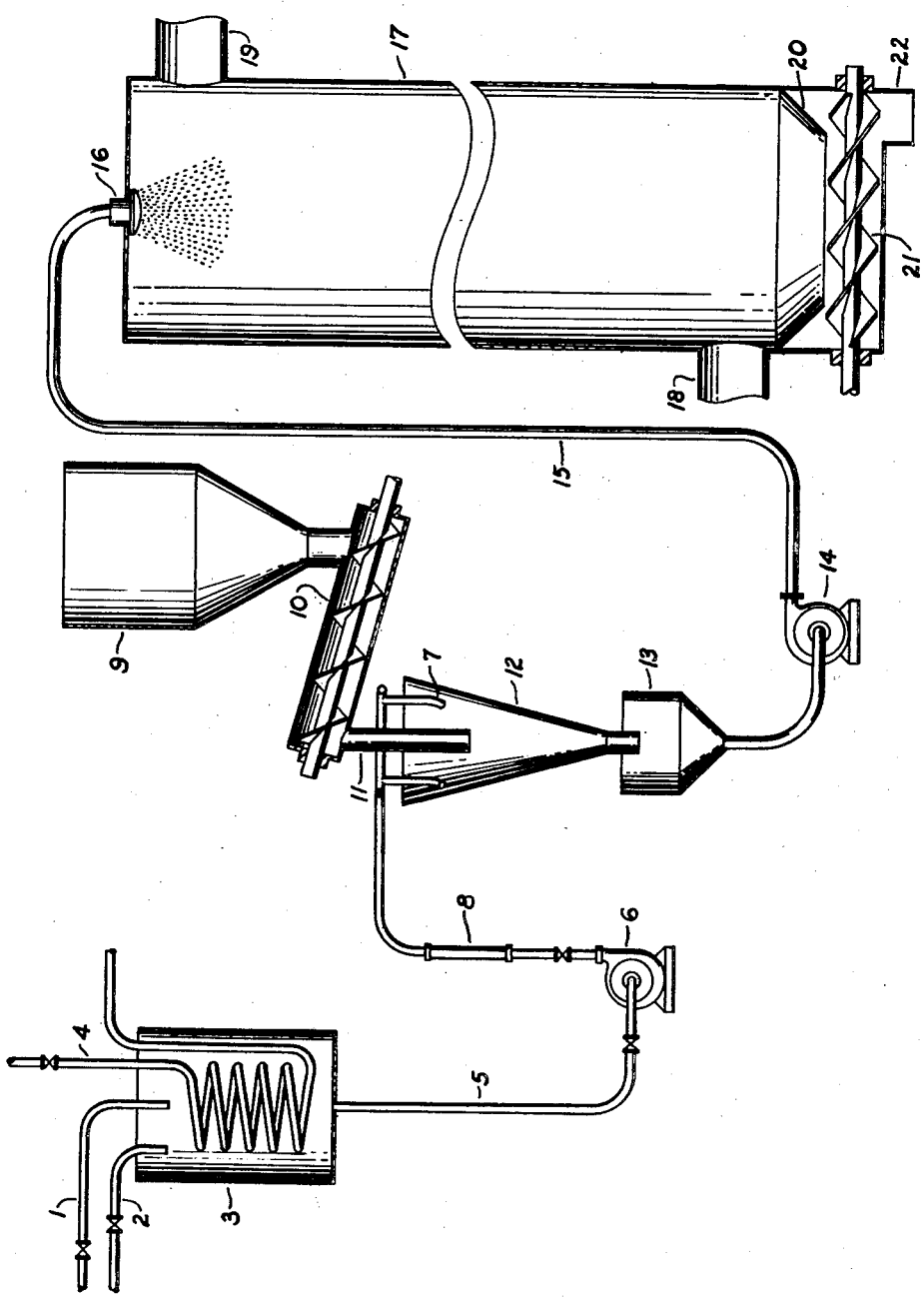
GROVER L. BRIDGER INVENTOR.
BY Bentley C. Morrow
Attorney Patented Sept. 19, 1950

2,522,500

UNITED STATES PATENT OFFICE 2,522,500

PRODUCTION OF PHOSPHATIC FERTILIZERS

Grover L. Bridger, Ames, Iowa, assignor to Tennessee Valley Authority, a corporation of the United States Application April 20, 1949, Serial No. 88,663

4 Claims. (Cl. 71—41)

(Granted under the act of March 3, 1883, as amended April 30, 1928; 370 O. G. 757)

The invention herein described may be manufactured and used by or for the Government for governmental purposes without payment to me of any royalty thereon.

This invention relates to improvements in the manufacture of phosphatic fertilizers. In a particular aspect it relates to improvements in the manufacture of granular phosphatic fertilizers having a mole ratio of CaO to $P_2O_5$ of approximately 1:1.

Fertilizers in granular form are receiving increasing favor by fertilizer manufacturers and users. From the standpoint of the user, the granular material is more conveniently applied to the soil than is the ordinary run-of-pile material, and the application losses are lower. From the fertilizer manufacturer's standpoint, production of dry granules is advantageous because the material has less tendency to cake and to cause rotting of bags.

Granular superphosphate is ordinarily produced commercially by subjecting fresh or partially cured superphosphate, under properly controlled conditions, to a tumbling action, whereby moist granules are obtained. These granules are then dried and stored for further curing.

Another means of producing granular fertilizers is by the spray tower method. Use of this method on a commercial scale, however, has been confined principally to fertilizers other than superphosphates. The spray tower method of producing granular superphosphate offers several important advantages over present commercial methods. Among these advantages are relative simplicity of equipment, substantially less time in process from mixing to curing, and more uniform size of product.

U. S. Patent 1,442,318 discloses a process wherein a solution containing acid calcium phosphate is prepared and sprayed into a volume of warm air to remove the moisture therefrom. The pressure used in spraying the solution is regulated to obtain the desired particle size of the product.

U. S. Patent 1,689,697 likewise discloses a procedure involving dissolving monocalcium phosphate in water and spray-drying the solution to form small spherical particles.

British Patent 330,777 discloses a process wherein a slurry of milk of lime is added to concentrated phosphoric acid to form a suspension of acid calcium phosphate, and the suspension is sprayed into warm air to obtain dried acid calcium phosphate.

The processes of the aforementioned patents, while they may be practical for the manufacture of food-grade phosphates, would be uneconomical for the production of fertilizers, on which there is a relatively low margin of profit. The cost of preparing a solution of monocalcium phosphate, which has low solubility in water, and the cost of heat required to evaporate the solution (as in U. S. 1,442,318 and 1,689,697) would be prohibitive in the manufacture of fertilizers. The preparation of phosphate fertilizer from milk of lime and phosphoric acid (as in British 330,777) would also be uneconomical, since all of the $P_2O_5$ in the fertilizer must be obtained from the relatively costly phosphoric acid.

U. S. Patent 1,790,502 discloses a process wherein phosphate rock is reacted with dilute (34 to 41 per cent $H_3PO_4$) phosphoric acid and the reaction mixture is dried in a spray drier. The method disclosed is a satisfactory one for the manufacture of concentrated superphosphate fertilizer, but the problem remains of finding a means to avoid the relatively high expense of evaporation which results from use of the dilute acid.

U. S. Patent 2,072,980, issued to the assignee of this application, discloses a process for producing concentrated superphosphate wherein heated concentrated (at least 65 per cent $H_3PO_4$) phosphoric acid and fine phosphate rock are mixed in a high-speed paddle-type mixer, and the fluid, partially reacted mixture is dispersed into a tower where it is contacted with heated gas. The advantage of this method over methods employing dilute phosphoric acid is that less water must be evaporated in the spray tower. However, the fluid, partially reacted mixture of phosphate rock and strong phosphoric acid sets to a solid within a very short time, the time of high fluidity varying from 10 to 45 seconds, depending on the combination of conditions in effect. The time available for complete mixing and for dispersion of the mixture into the tower is so short that the distributor used to disperse the mixture frequently becomes plugged or coated with solid superphosphate, and operation must be suspended until the distributor can be cleaned. This promising method for producing granular concentrated superphosphate has therefore been found to have the disadvantage of requiring frequent cleaning of the distributor system.

From these examples it is evident that many of the problems of the prior art could be avoided if there were available a fluid mixture of phosphate rock and strong phosphoric acid which could be continuously dispersed into a spray tower without necessity for frequent shutdowns for cleaning the fluid distributor.

It is, therefore, an object of this invention to provide a method for producing such a fluid mixture of phosphate rock and strong phosphoric acid.

Another object is to provide a method for producing a mixture of phosphate rock and strong phosphoric acid wherein the mole ratio of CaO to $P_2O_5$ is approximately 1:1 and which is capable of being pumped and conveyed by conventional pumps and piping equipment without clogging.

Another object is to provide a mixture of phosphase rock and strong phosphoric acid wherein the mole ratio of CaO to $P_2O_5$ is approximately 1:1 and which will remain fluid while it is being conveyed through piping and while it is being dispersed in a spray nozzle, but which will, upon being dispersed and contacted by heated gases in a spray tower, quickly set up to a solid form.

Other objects and advantages will become apparent from the following description, claims, and the attached drawing.

I have now found when superphosphoric acid is diluted with water to a $P_2O_5$ content of from 43 to 57 per cent (equivalent to from 65 to 78 per cent $H_3PO_4$) and the resulting acid is mixed with finely divided phosphate rock at temperatures below 140° F. within a short time subsequent to such dilution, that the resulting acid-rock mixture remains fluid and easily pumpable or sprayable for several minutes. This behavior is in strong contradistinction to that of equivalent mixtures of finely divided phosphate rock and orthophosphoric acid of similar strength, which set to solids within a few seconds.

I have also found that the objects of this invention may be attained by diluting superphosphoric acid with water to a $P_2O_5$ content of from 43 to 57 per cent; intimately mixing the diluted acid with finely divided phosphate rock in such proportions that the mole ratio of CaO to $P_2O_5$ in the mixture is approximately 1:1 while maintaining the temperature of the mixture within the range of from 100° to 140° F.; dispersing the resulting fluid partially reacted mixture downwardly into an upper part of a vertical heated zone; and withdrawing granular phosphatic fertilizer from a lower part of said heated zone.

The term "superphosphoric acid" as employed in this specification and in the appended claims is defined as being phosphoric acid containing from about 75 to 87 per cent $P_2O_5$. Orthophosphoric acid ($H_3PO_4$) contains 72.44 per cent $P_2O_5$.

DRAWING

The single figure attached is a diagrammatic vertical view of one form of apparatus suitable for carrying on a process embodying my invention.

In the single figure superphosphoric acid and water are admitted at controlled rates through valved lines 1 and 2 respectively to dilution tank 3, which is fitted with cooling coil 4. The resulting diluted superphosphoric acid is withdrawn from dilution tank 3 and delivered to nozzles 7 through line 5 by means of pump 6. The rate of flow of the diluted acid is maintained at a controlled value by means of rotamatic controller 8. Finely ground phosphate rock contained in bin 9 is delivered to spout 11 at a controlled rate by means of variable-speed screw conveyer 10. Diluted superphosphoric acid and finely ground phosphate rock are simultaneously introduced by the aforesaid means to mixing vessel 12 wherein they are intimately mixed. (The mixing vessel 12 and related means for introducing rock and acid illustrated in the accompanying drawing are described and claimed in co-pending application Serial No. 792,888, of Stewart A. Harvey and Grover L. Bridger.) The fluid partially reacted mixture is discharged from the mixing vessel 12 to the tank 13, from which it is delivered by means of pump 14 through line 15 to fluid distributor 16. The fluid mixture is dispersed in the form of small droplets by fluid distributor 16 into spray tower 17 where it is contacted by heated gas, from a source not shown, which is admitted to the spray tower 17 through duct 18 and which leaves the tower through duct 19 to a stack not shown. The fluid droplets, in contact with the heated gas, quickly set up to solid particles, and these particles are collected in the hopper 20, mounted at the lower end of the tower, and are removed either continuously or intermittently by means of screw conveyer 21 through chute 22.

EXAMPLE I

Tests were conducted in the study of my process which demonstrate the greatly increased fluid time of acid-rock mixtures obtainable through the use of diluted superphosphoric acid. These tests were carried out in an apparatus consisting of a mixer and a trough inclined 10 degrees to the horizontal. In each test acid and finely ground phosphate rock, in such proportions that the mole ratio of CaO to $P_2O_5$ in the mixture was 1:1, were fed to the mixer where the acid and rock were thoroughly mixed by means of an agitator. After five seconds' mixing time the resulting fluid mixture was discharged to the trough, and the period of time required for the mixture to reach a viscous state during its flow down the trough was noted. Identical samples of phosphate rock were used in all runs.

In one series of runs, mixtures were prepared from 78 per cent orthophosphoric acid (56.5 per cent $P_2O_5$). In another series of runs, mixtures were prepared from acid obtained by diluting superphosphoric acid containing 85 per cent $P_2O_5$ to a $P_2O_5$ content of 56.5 per cent. The average results of these tests are given in Table 1 below.

*Table 1*

| Temperature of Acid-Rock Mixture, °F. | Time Required to Reach Viscous State | |
|---|---|---|
| | Orthophosphoric Acid | Diluted Superphosphoric Acid |
| | *Seconds* | *Minutes* |
| 100 | 13 | 11.1 |
| 130 | 7 | 6.2 |

The results of these tests show that acid-rock mixtures prepared from diluted superphosphoric acid have a much longer fluid time than mixtures prepared from orthophosphoric acid of the same $P_2O_5$ content. The results also show that the fluid time of the mixture decreases as the temperature of the mixture increases.

It is well known that the rate of reaction between phosphoric acid and phosphate rock proceeds more rapidly at elevated temperatures than at low temperatures. This is also true of the reaction between diluted superphosphoric acid and phosphate rock. Since it is desirable that the reaction between the diluted superphosphoric acid and phosphate rock takes place as rapidly as possible once the fluid mixture has been dispersed into the spray tower, it is necessary to make a compromise between fluid time and reaction rate. I prefer, therefore, to maintain the temperature of the mixture before spraying within the range from 100° to 140° F. The temperature of the mixture may be maintained within this range conveniently by cooling the diluted superphosphoric acid.

EXAMPLE II

Other tests were conducted to determine whether diluted superphosphoric acid-phosphate rock mixtures could be pumped and sprayed. Previous work had indicated that mixtures of orthophosphoric acid stronger than 65 per cent and phosphate rock set to a solid state too rapidly to permit continuous spraying even when the mixture was located directly above the sprayer. Tests on the diluted superphosphoric acid mixtures were conducted in apparatus consisting of a mixing tank; a rotary, flexible-impeller pump; and a spray nozzle. Batches of diluted superphosphoric acid and fine phosphate rock were mixed in the tank for aproximately 30 seconds. After mixing, the material was withdrawn from the tank by the pump and delivered to the spray nozzle. Spraying was continued until the tank was emptied. With the equipment employed, this required approximately 3 minutes. The diluted superphosphoric acid employed in these tests varied in $P_2O_5$ content from 43.5 to 56.5 per cent (equivalent to 60 to 78 per cent $H_3PO_4$ respectively). In each case the mixture exhibited satisfactory pumping and spraying characteristics. It was noted, however, that the mixtures tested were more fluid at the start of the pumping operation than at the end. It is concluded from these tests that the elapsed time between mixing and dispersion should not exceed about 3 minutes, and that in continuous operation it is preferable that the mixture discharged from the continuous mixer be delivered to the spray nozzle within 1 to 1½ minutes.

I have also found that the fluid time of diluted superphosphoric acid-phosphate rock mixtures decreases as the elapsed time between dilution of the superphosphoric acid and mixing of the diluted acid with rock increases. I have found it desirable to limit this elapsed time to about 30 minutes.

EXAMPLE III

An example of the operation of my process is given: Superphosphoric acid, containing 85 per cent $P_2O_5$ by weight, and water are continuously fed at rates of 1490 and 1010 pounds per hour respectively to a dilution tank where the acid is diluted by the water to give acid containing 50.6 per cent $P_2O_5$, which is equivalent in $P_2O_5$ content to 70 per cent $H_3PO_4$. Cooling liquid is circulated through cooling coils mounted in the tank, and the diluted acid is withdrawn from the dilution at a temperature of about 120° F. and is pumped at a constant rate to the nozzles of a continuous mixer. Finely ground phosphate rock containing about 32 per cent $P_2O_5$, is simultaneously fed to the mixer at a rate of 2000 pounds per hour. Acid and rock are intimately mixed in the mixer, and the resulting partially reacted fluid mixture is pumped to a distributor located at the top of a spray tower and is sprayed into the tower in the form of small droplets. Heated gas at a temperature of about 250° F. is passed into the tower near the bottom, and a duct located near the top of the tower carries the gas from the tower to a stack. Upon contacting the heated gas in the tower, the fluid droplets of partially reacted phosphate rock-phosphoric acid mixture quickly set up to solid, spheroidal-shaped particles. As these particles descend through the tower the reaction between the rock and the acid goes substantially to completion to form, essentially, the monohydrate of monocalcium phosphate, and uncombined moisture is evaporated from the particles. The product, triple superphosphate, is removed from the bottom of the tower in the form of dry, hard granules which are substantially spherical in shape.

THEORY

The following discussion is presented as a possible explanation for the greatly increased fluid time of mixtures of diluted superphosphoric acid and phosphate rock over that of mixtures prepared from orthophosphoric acid of the same $P_2O_5$ content.

It is probable that phosphoric acids containing more than 72.44 per cent $P_2O_5$ consist of equilibrium mixtures of ortho-, meta-, and possibly pyrophosphoric acids. Upon dilution with water to a $P_2O_5$ content of less than 72.44 per cent these strong acids hydrolyze at varying rates, until eventually the acid consists of orthophosphoric acid alone. The rate of hydrolysis increases with increase in temperature.

When superphosphoric acid is diluted with water and is then mixed with finely ground phosphate rock, the incompletely hydrolyzed acid reacts with the rock very slowly as compared with orthophosphoric acid of equivalent strength. Because the reaction proceeds more slowly, the mixture remains fluid for a longer time. The mixture remains fluid for several minutes if the temperature is kept sufficiently low, to say 100° to 140° F. However, when the fluid mixture is dispersed into a spray tower and contacted with hot gases the unreacted acid hydrolyzes rapidly, the reaction rate between rock and acid increases, and the dispersed droplets set up to solid particles.

MODIFICATIONS

While my invention has been described in terms of a particular mode of operation in a particular form of apparatus, it is evident that numerous modifications both in mode of operation and in apparatus are possible without departing from the scope of the invention. For instance, instead of carrying out the dilution of superphosphoric acid with water continuously, the dilution may be carried out batchwise, provided the elapsed time between dilution and mixing with rock does not exceed about 30 minutes. In like manner, the mixing of diluted acid and phosphate rock may be carried out batchwise so long as the time between mixing and dispersion into the spray tower is not greater than about 3 minutes.

The equipment in which my process may be carried out may differ greatly from that shown in the accompanying drawing. The equipment may be so arranged that diluted acid flows by gravity to the acid-rock mixer. Similarly, the fluid acid-rock mixture may be discharged directly from the mixer to the fluid distributor by gravity. I prefer, however, to pump the fluid from the mixer to the distributor, since by this means it is possible to regulate the pressure of the mixture and thereby control the size of the dispersed particles.

Calcium metaphosphate may be produced in the spray tower instead of triple superphosphate by providing an upper zone wherein the temperature is sufficiently high to fuse the particles descending through the zone and to drive off chemically combined water, and a lower, cool zone wherein the fused particles descending from the upper, hot zone are cooled to hard, solid particles. A temperature of at least 1800° F. is necessary in the upper zone to accomplish fusion of the particles and to drive off the chemically combined water.

Having thus described my invention and explained its operation, I claim:

1. In a process for the manufacture of granular phosphatic fertilizer wherein an aqueous solution of phosphoric acid is mixed with phosphate rock, the resulting mixture is dispersed in droplets into an upper part of a vertical heated zone, the droplets are dropped downward through the heated zone in countercurrent to a stream of heated gas, and the resulting granular phosphatic fertilizer is withdrawn from a lower part of the heated zone, that improvement which comprises diluting superphosphoric acid containing from about 75% to about 87% $P_2O_5$ with water to a concentration of about 43% to about 57% $P_2O_5$; maintaining the resulting diluted acid in the temperature range from about 100° F. to about 140° F.; after not more than 30 minutes from the time of such dilution intimately mixing the diluted acid with finely divided phosphate rock in such proportions that the mole ratio of CaO to $P_2O_5$ in the resulting mixture is approximately 1:1; maintaining the temperature of the mixture in the range from about 100° F. to about 140° F.; within from about 1 to about 1½ minutes from the time of such mixing, pumping the acid-rock mixture to said heated zone; spraying the mixture under pressure into an upper part of the heated zone; and passing a stream of gas at a temperature in the range from about 250° F. to about 1800° F. upward through the heated zone.

2. In a process for the manufacture of granular phosphatic fertilizer wherein an aqueous solution of phosphoric acid is mixed with phosphate rock, the resulting mixture is dispersed in droplets into an upper part of a vertical heated zone, the droplets are dropped downward through the heated zone in countercurrent to a stream of heated gas, and the resulting granular phosphatic fertilizer is withdrawn from a lower part of the heated zone, that improvement which comprises diluting superphosphoric acid containing from about 75% to about 87% $P_2O_5$ with water to a concentration of about 43% to about 57% $P_2O_5$; maintaining the resulting diluted acid in the temperature range from about 100° F. to about 140° F.; after not more than 30 minutes from the time of such dilution intimately mixing the diluted acid with finely divided phosphate rock in such proportions that the mole ratio of CaO to $P_2O_5$ in the resulting mixture is approximately 1:1; maintaining the temperature of the mixture in the range from about 100° F. to about 140° F.; within from about 1 to about 1½ minutes from the time of such mixing, spraying the mixture under pressure into an upper part of the heated zone; and passing a stream of gas at a temperature in the range from about 250° F. to about 1800° F. upward through the heated zone.

3. In a process for the manufacture of granular phosphatic fertilizer wherein an aqueous solution of phosphoric acid is mixed with phosphate rock, the resulting mixture is dispersed in droplets into an upper part of a vertical heated zone, the droplets are dropped downward through the heated zone in countercurrent to a stream of heated gas, and the resulting granular phosphatic fertilizer is withdrawn from a lower part of the heated zone, that improvement which comprises diluting superphosphoric acid containing from about 75% to about 87% $P_2O_5$ with water to a concentration of about 43% to about 57% $P_2O_5$; maintaining the resulting diluted acid in the temperature range from about 100° F. to about 140° F.; after not more than 30 minutes from the time of such dilution intimately mixing the diluted acid with finely divided phosphate rock in such proportions that the mole ratio of CaO to $P_2O_5$ in the resulting mixture is approximately 1:1; maintaining the temperature of the mixture in the range from about 100° F. to about 140° F.; within not more than 3 minutes from the time of such mixing, forcing the resulting fluid acid-rock mixture under pressure to said heated zone; and spraying the mixture under pressure into an upper part of the heated zone.

4. In a process for the manufacture of granular phosphatic fertilizer wherein an aqueous solution of phosphoric acid is mixed with phosphate rock, the resulting mixture is dispersed in droplets into an upper part of a vertical heated zone, the droplets are dropped downward through the heated zone in countercurrent to a stream of heated gas, and the resulting granular phosphatic fertilizer is withdrawn from a lower part of the heated zone, that improvement which comprises diluting superphosphoric acid containing from about 75% to about 87% $P_2O_5$ with water to a concentration of about 43% to about 57% $P_2O_5$; maintaining the resulting diluted acid in the temperature range from about 100° F. to about 140° F.; after not more than 30 minutes from the time of such dilution intimately mixing the diluted acid with finely divided phosphate rock in such proportions that the mole ratio of CaO to $P_2O_5$ in the resulting mixture is approximately 1:1; maintaining the temperature of the mixture in the range from about 100° F. to about 140° F.; and, within not more than 3 minutes from the time of such mixing, spraying the mixture under pressure into an upper part of the heated zone.

GROVER L. BRIDGER.

REFERENCES CITED

The following references are of record in the file of this patent:

UNITED STATES PATENTS

| Number | Name | Date |
| --- | --- | --- |
| 1,078,887 | Willson et al. | Nov. 18, 1913 |
| 1,790,220 | Balz et al. | Jan. 27, 1931 |
| 2,072,980 | Curtis | Mar. 9, 1937 |
| 2,108,940 | McIntire | Feb. 22, 1938 |
| 2,133,286 | Fiske | Oct. 18, 1938 |
| 2,173,826 | Curtis | Sept. 26, 1939 |
| 2,272,414 | McCullough | Feb. 10, 1942 |

OTHER REFERENCES

Lum et al., Chem. and Met. Engr., vol. 44, No. 12, Dec. 1937, pages 721-727.